Nov. 27, 1962 J. H. GOLDMAN 3,065,856
FLUID FILTER AND METHOD OF MAKING SAME
Filed April 29, 1958 4 Sheets-Sheet 1

INVENTOR
Joshua H. Goldman
BY Rockwell Bartholow
ATTORNEYS

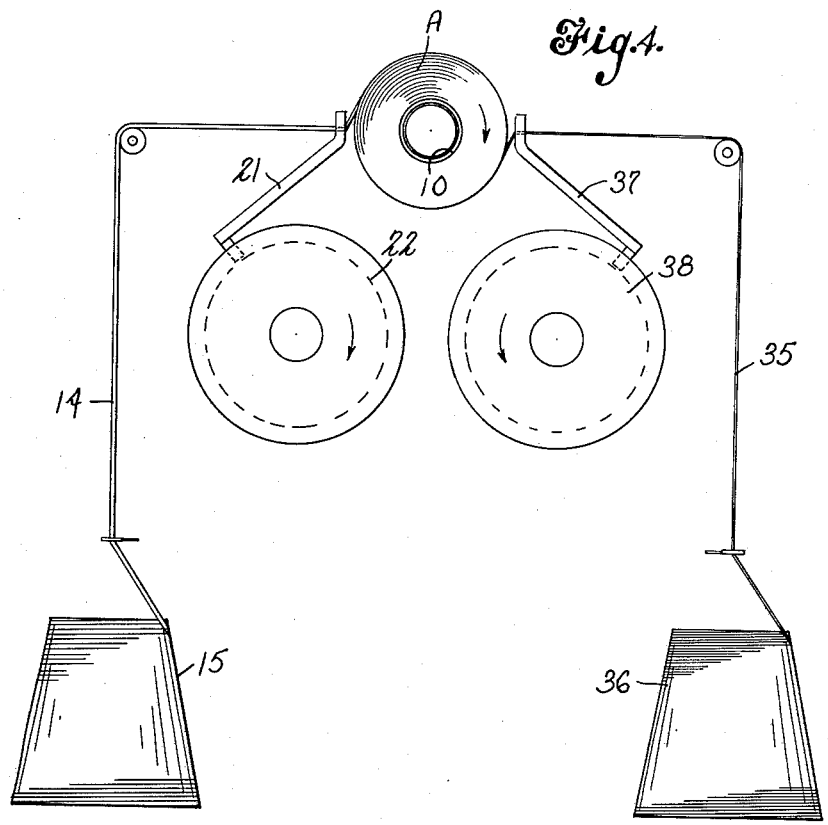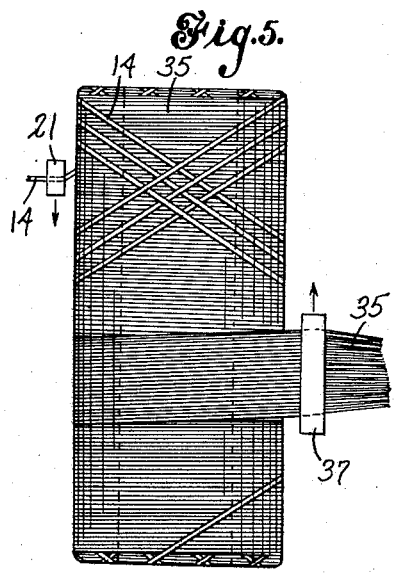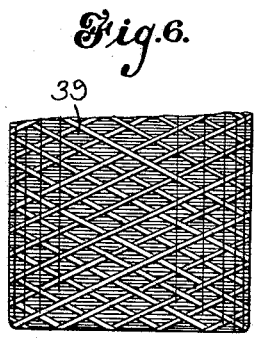

Nov. 27, 1962  J. H. GOLDMAN  3,065,856
FLUID FILTER AND METHOD OF MAKING SAME
Filed April 29, 1958  4 Sheets-Sheet 3
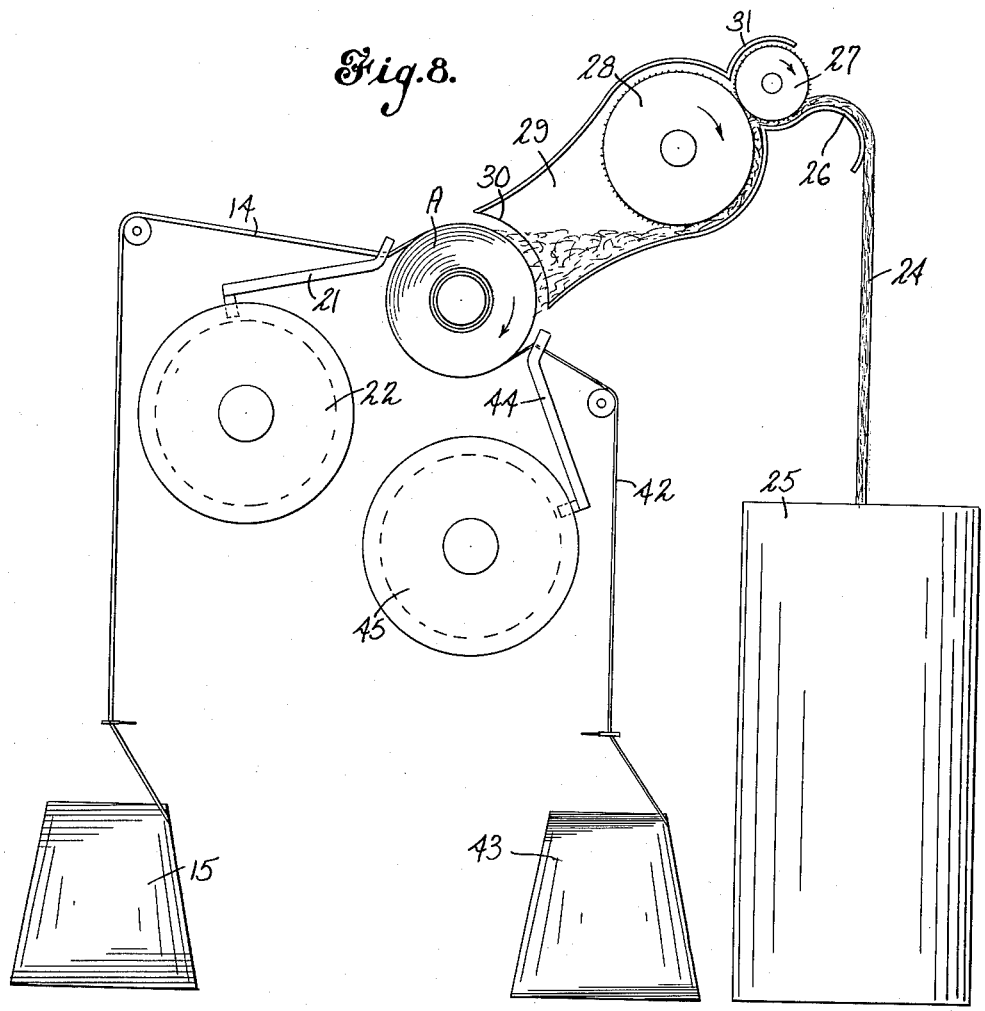
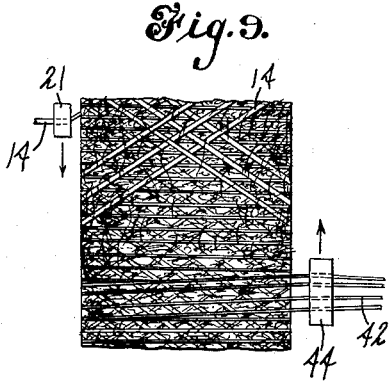
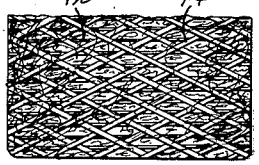
INVENTOR
Joshua H. Goldman
BY
Rockwell Barthelow
ATTORNEYS Nov. 27, 1962 J. H. GOLDMAN 3,065,856
FLUID FILTER AND METHOD OF MAKING SAME
Filed April 29, 1958 4 Sheets-Sheet 4
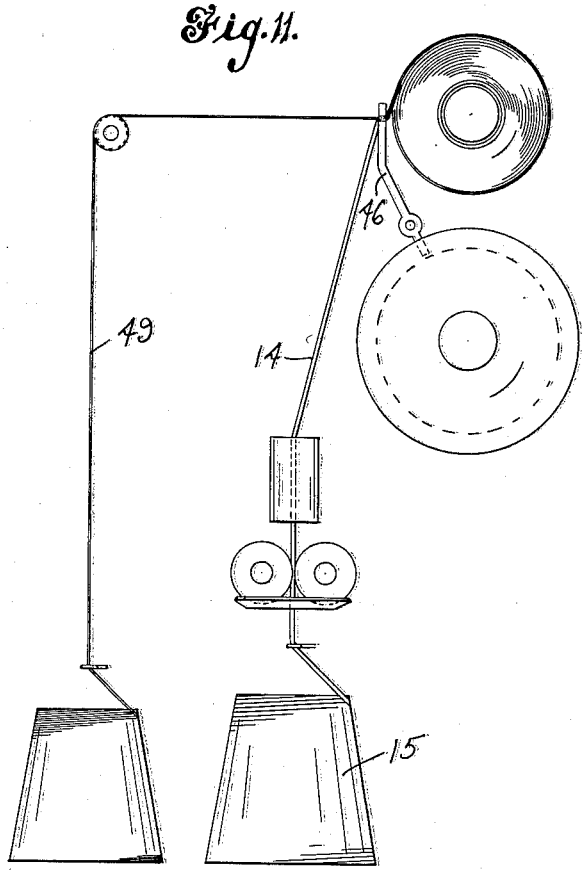
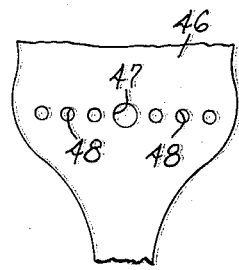
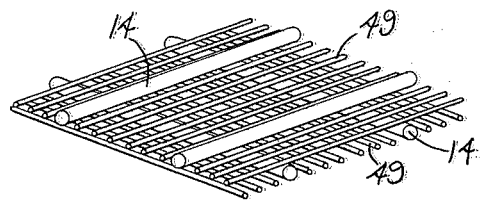
INVENTOR
Joshua H. Goldman
BY Rockwell Bertholow
ATTORNEYS

United States Patent Office 3,065,856
Patented Nov. 27, 1962

3,065,856
FLUID FILTER AND METHOD OF MAKING SAME
Joshua H. Goldman, Hadlyme, Conn.
Filed Apr. 29, 1958, Ser. No. 731,682
12 Claims. (Cl. 210—494)

This invention relates to a fluid filter and a method of making the same, and more particularly to a filter which comprises a winding of yarn or roving having incorporated therewith a septum, mat or sheet of filtering material.

Filters of this general type have previously been made by winding upon a perforated or foraminous metal tube a roving or strand of textile material to make diamond-shaped apertures extending from the outside to the inside of the resulting cylindrical filter. These apertures are pyramidal in shape in that their length decreases toward the core circumferentially of the body of the filter so that the openings between the strands or cords are somewhat smaller in length near the center than at the circumference of the completed filter.

As this roving or strand is wound, the material of the strands is napped so as to produce fibers extending across the openings between the strands. These napped fibers are supported only at one end in some instances and their density depends on the amount of material which can be napped from the strands themselves. The filtering is not effected by the cords but by the combed or napped fibers which extend across the diamond-shaped apertures between the cords. Usually when used as an oil filter the oil will pass from the outside to the inside and be discharged from the center core of the filter spool.

It will be seen, therefore, that the filtering media must be of the same material as the strands or cords of yarn or roving which is employed and moreover the filtering fibers are principally supported only at one of their ends in cantilever fashion. Also as the material which can be removed from the cords or strands is limited, therefore the density of the filtering septum or mat is limited as well as the kind of material of which the filtering mat is made.

It is contemplated by the present invention to provide a filter in which the filtering media is applied separately from, but simultaneously with, the roving, cords or strands while the latter are being wound upon the inner supporting metallic core. The strands or cords which form the supporting structure of the filter are wound in a manner similar to that previously employed and, at the same time that the wrapping is effected, the filtering material is laid upon the strands in layers to cover the diamond-shaped spaces between the wrappings. Such a filter has a number of advantages, some of which will now be enumerated.

With the present construction there may be provided a continuous sheet, mat or septum of filtering material as contrasted with the cantilever type fibers previously resulting from the napping of the yarn.

It is not necessary to deplete the material of the roving, yarn or cord by employing a part of it to make the fibers which constitute the filtering media so that the amount of fibrous or filtering material may be determined independently from the size of the strands used. That is to say, a predetermined type of strand or yarn may be used for the winding which will not be disturbed and also a predetermined amount of fibrous material for filtering purposes can be employed, which amount will not be dependent upon the amount that can be combed or napped from the yarn itself but can be independently determined.

The material of which the yarn is made and that of the filtering media can be chosen independently and one kind of material used for one of the elements and another kind for the other, if desired. This will permit the use of a lower-priced yarn, if this is found desirable, and the use of substances which may have characteristics not possessed by yarn. For example, glass, aluminum or copper strands may be used instead of yarn. Such substances could not be used at the present time as they cannot be napped. Glass, for example, could be used either for the yarn or the filter material as glass strands or threads or even fibers could be wound coincidentally with the winding of the main strand or supporting material.

Also the filter might be made of diverse substances such as wool and cotton in that one of these materials could be used for the supporting strand and the other for the filtering media. It has been found that when two different materials are used, better results are often secured. It is possible that the two materials carry opposite charges and one may catch and hold positively charged particles while the other will retain the negatively charged particles.

Also it is possible to employ filaments of magnesium or other material which may have a neutralizing effect upon the acids in the oil or other material to be filtered. Aluminum may be employed to counteract a basic or alkaline condition. These filaments may be interleaved with the structural yarn at the same time that the fibrous filtering media is applied.

The supporting yarn or strand can be of any size desired and, as it does not have to be napped, can be one of hard lay providing more filtering area than is obtained when a yarn is used which must be napped to provide the filtering media.

Glass may be used for either the strand or the filtering material for glass fibers can be thrown upon the wound glass strands to provide the filtering material and thus a filter of great durability can be provided.

In addition the fibers which are applied for the filtering media may be of any desired length as the length is not limited to that which may be napped from the strands themselves. A long fiber has the advantage of being supportable at both ends and not merely a cantilever type of support as is true when the filtering fibers are napped from the strands.

One object of the present invention is to provide a new and improved fluid filter.

A further object of the invention is to provide a new and improved method for making a fluid filter.

Still another object of the invention is to provide a fluid filter comprising a body applied to a cylindrical core having openings therein, the body being formed of strands wound upon the core to present pyramidal openings therebetween, which openings are covered by filtering media.

Still another object of the invention is to provide a filter of the character described wherein the filtering media consists of a material different from that employed for the wound strands or body of the filter.

Still another object of the invention is to provide a fluid filter of the character described wherein the filtering media comprises a mat, septum or layer of filtering material applied indepedently of, but coincidentally with, the winding of the yarn of strands which forms the body of the filter.

Still another object of the invention is to provide a fluid filter of the character described wherein may be employed, together with the filtering material and the wound strand which supports it, wires or filaments of a metallic material which may serve to neutralize the acid in the liquid to be filtered or may serve other purposes.

To these and other ends the invention consists in the novel features and combinations of parts to be hereinafter described and claimed.

In the accompanying drawings:

FIG. 4 is a diagrammatic view similar to FIG. 1, showing another method of making a fluid filter embodying the principles of my invention;

FIG. 5 is an elevational view of a filter during the manufacture thereof, showing the filter as it appears in one stage of its manufacture;

FIG. 6 is a fragmentary elevational view of the completed filter;

FIG. 7 is a plan view of a short length of filtering material which may be employed in the filter illustrated in FIGS. 4 to 6;

FIG. 8 shows a further method of making a filter embodying the present invention;

FIG. 9 is a fragmentary elevational view illustrating the appearance of the filter during its manufacture;

FIG. 10 is a fragmentary elevational view of the completed filter;

FIG. 11 shows a further method of making a filter;

FIG. 12 is an elevational view of the guide employed; and

FIG. 13 is an enlarged fragmentary view of the completed filter.

Figure 2:
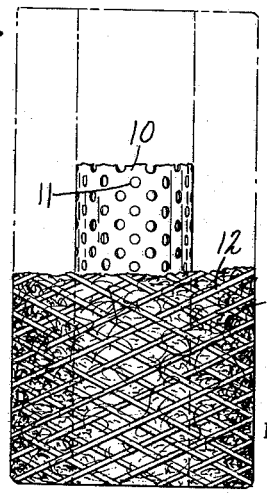
FIG. 2 is a partial elevational view, parts being broken away, of the completed filter.

As illustrated in FIG. 2 of the drawings, the filter may be applied to or wound upon a cylindrical metallic core 10 provided with perforations 11 or a core of foraminous material may be employed such, for example, as shown in the Goldman Patent No. 1,958,268. As indicated at 12, a strand which may be of yarn, for example, is wound upon the core, first in one direction and then in the other, so that between the crossed cords are openings extending from the outer periphery of the filter to the core. It will be apparent that as the winding increases in diameter upon the core, the diamond-shaped spaces between the strands will be longer as respects their dimensions circumferentially of the filter, and hence the pyramids formed between the strands extending from the outer surface to the core will taper inwardly.

Between the strands or cords 12 a mat or septum 13 is laid as a filtering media which preferably comprises relatively long fibers of a filtering material, the fibers being supported by the cords or strands and extending from one to the other thereof so that they will be supported at both ends.

Figure 1:
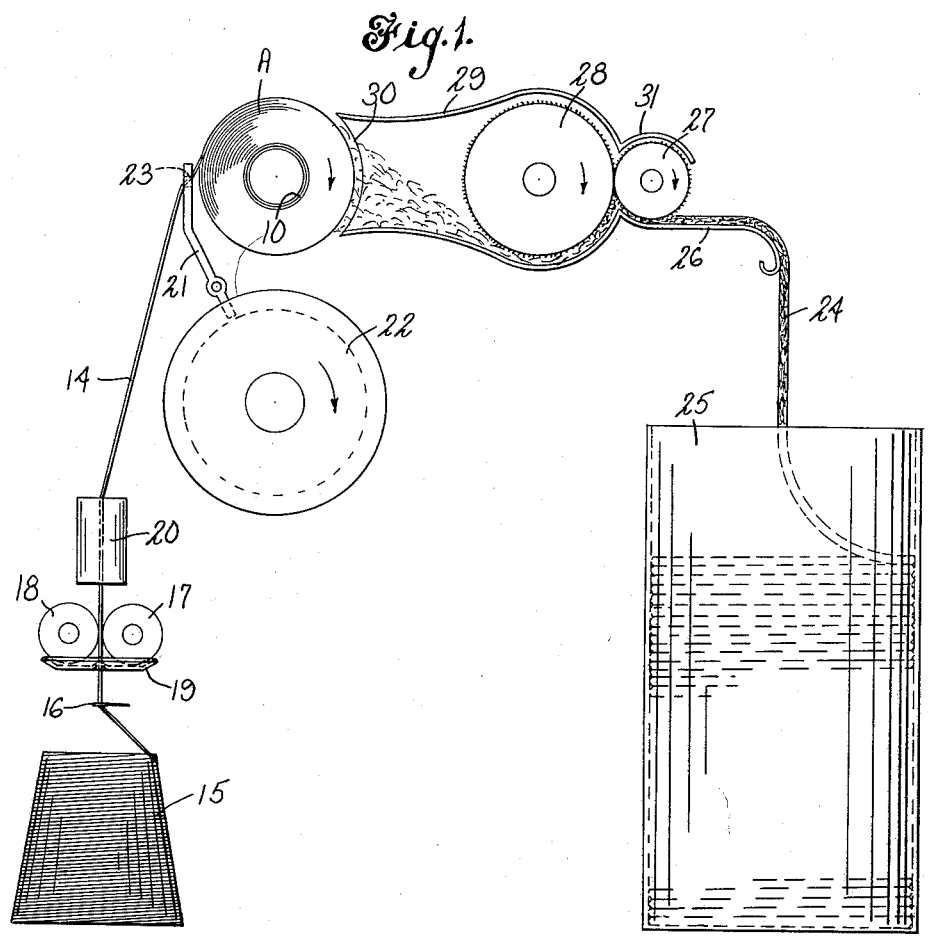
FIG. 1 is a diagrammatic view showing the novel method of making a fluid filter.

One method of making the improved filter is shown in FIG. 1 wherein the filter cartridge designated at A is being applied to the core 10. It will be understood that the latter is rotated by suitable means (not shown) in the direction of the arrow. The rotation may be at any desired speed for efficient operation, for example, a speed of the order of 1,000 revolutions per minute. The roving or yarn 14 which comprises the body of the filter is supplied from a spool or other source of supply 15 and passes through a guide 16 and between a pair of wet-out rolls 17 and 18 which dip into a pan or tray 19 in order to supply the roving strand or yarn to the filter cartridge in proper condition.

From the wet-out rolls the yarn passes through a tension device 20 of any usual form to maintain the roving under proper tension. A traversing guide member 21 is actuated by a rotating cam 22 so as to cause this member to traverse the cartridge A in a direction parallel to its axis so as to lay the yarn in helical form upon the cartridge. It will be understood that at its outer end this guide is provided with a fork or opening 23 to engage the strand 14.

Figure 3:
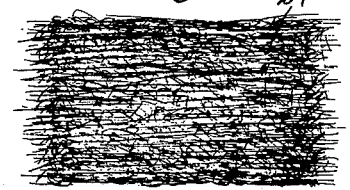
FIG. 3 is an elevational view of a short length of sliver which may be disintegrated or carded to provide the filtering media.

As previously stated, the filtering media is applied to the filter or cartridge independently of the strand 14. As shown, this material may be supplied in the form of a loose sliver 24 of relatively long fibers, as shown in FIG. 3. The sliver may be in the form of a loose light rope or strand, as shown, and may be unwound from the supply in the container 25. This sliver passes over a guide 26 and is engaged by a clothed feed roll 27 which feeds it to a clothed cylinder or carding roll 28.

The roll 27 may be operated at a relatively slow speed, say two revolutions per minute, while the carding cylinder 28 rotates at a rapid speed, sometimes of the order of 10,000 revolutions per minute. The latter roll is mounted in a housing 29 which is open at its forward end, as shown at 30, adjacent the filter or cartridge A so that the fibers carded from the sliver 24 will be deposited upon the strands as they are being laid in the filter or cartridge body. A rear portion of the housing 29 may extend over the feed roll 27, as shown at 31, to house the latter roll and prevent any tendency of the fibers to be carried rearwardly. It will be understood that the speed of the carding roll or cylinder 28 will be sufficient to throw the fibers onto the cartridge A but, if desired, a blower or air stream may be employed to propel them. Alternatively, a negative pressure may be provided at the spool to draw the carded material onto the winding of the cartridge.

The sliver 24 which is used may be of any desired material which can be carded and may be of a different kind from that of the yarn or strand 14. As these fibers are thrown onto the cartridge while the yarn is being wound, they will be held by the latter and, as long fibers are preferably used, will span the spaces between the yarn. If desired, however, a suitable adhesive may be introduced into the tray 19 so as to cause the fibers to cling to the yarn windings.

In FIGS. 4 to 6 of the drawings, there is shown a filter and method of making the same wherein a tape of fibrous filtering material is wound on the spool concurrently with the yarn winding and will provide a continuous wrap upon and within each successive layer of the yarn itself. As shown in FIG. 4 of the drawings, the yarn 14 is wound upon the cartridge A from a supply spool 15 by means of the traversing guide member 21 and its controlling cam 22 as before. Simultaneously with the application of this winding, a flat tape-like member 35 is supplied from a supply spool 36 and is wrapped upon and within each successive layer of the yarn 14 upon the cartridge. The tape 35 is guided by a traversing guide 37 and controlled by the cam 38. The cartridge A will, of course, be rotated at a proper speed as before.

The tape 35 may consist of a ribbon of parallel filaments such as shown in FIG. 5, and this ribbon will be spirally wound upon the cartridge so as to provide successive layers of filtering material. The filaments may be of any desired material whether or not they can be carded and, of course, may be of material of the same character or of a different character than the yarn 14. A small section of the completed filter cartridge is shown at 39 in FIG. 6.

This tape, instead of comprising a ribbon of parallel filaments, as shown in FIG. 5, may consist of a strip of woven or nonwoven fabric, as shown at 40 in FIG. 7, or it may be a chaotically disposed web of fibers forming a relatively wide band or tape which may be applied as described. If applied as a group of strands or filaments, it may desirably be fine glass strands while the supporting yarn may be of any suitable material.

In FIGS. 8 to 10 of the drawings a further modification of the invention is disclosed wherein a yarn 14 is employed as before and also a sliver 24 is carded by the roll 28 and thrown on the cartridge, all as described in connection with FIG. 1.

In this instance, however, a plurality of parallel metallic wires 42 supplied by a spool 43 are wound about the cartridge by the traversing guide 44 and cam 45. These wires may be of any desired metallic material, for example, such as magnesium so as to have a neutralizing action on any acid which may be in the fluid to be filtered or aluminum to counteract a basic condition. In FIG.

9 of the drawings there is shown a partially completed cartridge made according to this method of manufacture which shows the lay of the strands 14 of yarn, the filtering fibers carded from the sliver 24, and the group of metallic strands or wires 42. A section of the completed cartridge is shown in FIG. 10.

Instead of employing the method shown in FIG. 4 to apply a plurality of filaments or strands as filtering media, I may employ the method shown in FIGS. 11 to 13. In this instance the traverse guide is in the form shown at 46 which is provided with a relatively large opening 47 for the strand of yarn 14 and a plurality of small openings 48, several of which are on each side of the opening 47 through which are laid the fine filaments of the filtering media. In this instance a number of the latter filaments will be laid upon each side of one of the strands 14 upon each rotation of the cartridge and upon the succeeding wrap the space between two adjacent strands of the yarn will be substantially filled.

As shown in FIG. 13, when the cartridge is thus made, there will be a space in a radial direction between the layers of the filaments of filtering material due to the fact that the strands of yarn are of greater diameter than those of the filtering material.

In the practice of this modification of the invention the filtering media may consist of discrete filaments, as shown, or it may be formed of a foraminous web of fibers in tape form passing through slots upon each side of the yarn opening 47 instead of through the fine openings 48 as illustrated.

While I have shown and described some embodiments of my invention, it is not to be limited to all of the details shown or to the particular process steps described, but is capable of modification and variation within the spirit of the invention and the scope of the appended claims.

What I claim is:

1. A tubular filter cartridge having a foraminous wall comprising a plurality of crisscrossed layers of strand material wound one on the next in axially spaced relationship whereby a series of passages extending from the inner surface of said cartridge to the outer surface thereof are generated and said cartridge further comprising a quantity of fibrous material supplied separately and simultaneously with strand material and between the layers thereof to bridge said passages and afford a filtering ability thereto.

2. A device according to claim 1 wherein said fibrous material is of discrete fibers in random orientation.

3. A device according to claim 1 wherein said fibrous material is a substantially continuous filament wound simultaneously with said strand material and having its turns in axially juxtaposed relationship.

4. A filter cartridge comprising a pervious core, a body comprising a plurality of superposed wrappings of strand material wrapped about said core in a crisscross manner in a plurality of superposed layers forming openings extending from said core outwardly to the periphery of the cartridge, a substantially continuous sheet of fibrous material lying upon said strands and extending across the spaces therebetween and lying between the superposed wrappings, and windings of a material different from that of the fibrous material disposed between the wrappings of the strand material.

5. A filter cartridge comprising a pervious core, a body comprising a plurality of wrappings of strand material wrapped around said core in layers and in axially spaced relationship in a crisscross manner with openings between the strands extending inwardly to the core from the periphery of the cartridge, and a filtering sheet of fibrous material comprising relatively long discrete fibers applied to the cartridge independently of the strands with the fibers thereof lying across the strands in a generally circumferential direction and bridging the spaces between adjacent strands to be supported thereby and forming a substantially continuous fibrous filtering septum supported by the strands, the diameter of the strands being sufficiently great to provide radial spacing of the sheets of fibrous material between superposed layers of the strands.

6. A filter cartridge comprising a pervious core, a body comprising a plurality of wrappings of strand material wrapped around said core in layers and in axially spaced relationship in a crisscross manner with openings between the strands extending inwardly to the core from the periphery of the cartridge, and a filtering sheet of fibrous material comprising relatively long discrete fibers applied to the cartridge independently of the strands with the fibers thereof lying across the strands in a generally circumferential direction and bridging the spaces between adjacent strands to be supported thereby and forming a substantially continuous nonwoven fibrous filtering septum supported by the strands, the diameter of the strands being sufficiently great to provide radial spacing of the sheets of fibrous material between superposed layers of the strands.

7. A filter cartridge comprising a pervious core, a body comprising a plurality of wrappings of strand material wrapped around said core in layers and in axially spaced relationship in a crisscross manner with openings between the strands extending inwardly to the core from the periphery of the cartridge, and a filtering sheet of fibrous material comprising relatively long discrete fibers applied to the cartridge independently of the strands with the fibers thereof lying across the strands in a generally circumferential direction and bridging the spaces between adjacent strands to be supported thereby and forming a substantially continuous fibrous filtering septum supported by the strands, the diameter of the strands being sufficiently great to provide radial spacing of the sheets of fibrous material between superposed layers of the strands, said filtering sheets being of a material different from that of the strands.

8. A tubular filter cartridge having a foraminous wall comprising a plurality of crisscrossed layers of strand material wound one on the next in axially spaced relationship whereby a series of passages extending from the inner surface of said cartridge to the outer surface thereof are generated, and said cartridge further comprising a quantity of fibrous material supplied separately and simultaneously with the strand material to form filtering sheets between the layers thereof, said fibrous material comprising relatively long discrete fibers bridging said passages, and said strands providing radial separation of the superposed filtering sheets.

9. A filter cartridge comprising a pervious core, a body of strand material wound thereon in superposed layers with the stands of each layer in axially spaced relationship and additional interleaved windings of strand material, the strands of which are of substantially smaller diameter than those of the first strand material, said interleaved windings being interwoven with the strands of the first-named strand material and lying between the superposed layers thereof to be held in place thereby.

10. A filter cartridge as in claim 5 in which windings of a metallic filament are disposed beteween the wrappings of the strand material.

11. The method of making a filter cartridge comprising winding a strand of material in a crisscross pattern on a pervious core in a plurality of superposed layers with the strands in axially spaced relation and in substantially superposed position to form radial openings extending from the periphery of the cartridge body to the core, and during said winding independently applying fibrous filtering material, comprising relatively long fibers, on said strands between the layers thereof to cause the fabric to lie flatly thereon and form filtering sheets axially spaced by the strands.

12. The method of making a filter cartridge comprising winding a strand of material in a crisscross pattern on a pervious core in a plurality of superposed layers with the strands in axially spaced relation and in substantially superposed position to form radial openings extending from the periphery of the cartridge body to the core, and during said winding carding a sliver of fibrous filtering material to produce relatively long fibers, and projecting the carded fibers upon the wound strands to extend across the space between the strands and lie flatly thereupon and be held in place by the superposed windings.

References Cited in the file of this patent

UNITED STATES PATENTS

| | | |
|---|---|---|
| Re. 22,651 | Hastings | June 12, 1945 |
| 1,751,000 | Goldman | Mar. 18, 1930 |
| 1,752,050 | Young | Mar. 25, 1930 |
| 1,958,268 | Goldman | May 8, 1934 |
| 2,028,061 | Goldman | Jan. 14, 1936 |
| 2,152,901 | Manning | Apr. 4, 1939 |
| 2,657,806 | Launder | Nov. 3, 1953 |
| 2,704,734 | Draper | Mar. 22, 1955 |
| 2,710,275 | Waggoner | June 7, 1955 |
| 2,740,184 | Thomas | Apr. 3, 1956 |

FOREIGN PATENTS

| | | |
|---|---|---|
| 618 | Great Britain | 1897 |
| 502,000 | Canada | May 4, 1954 |